US009975201B2

(12) United States Patent
    Anzai et al.

(10) Patent No.: US 9,975,201 B2
(45) Date of Patent: May 22, 2018

(54) FRICTION STIR WELDING APPARATUS

(71) Applicants: HONDA MOTOR CO., LTD., Tokyo (JP); FANUC CORPORATION, Yamanashi (JP)

(72) Inventors: Mami Anzai, Sakura (JP); Ichiro Fujimoto, Utsunomiya (JP); Masato Sato, Utsunomiya (JP); Mitsuru Sayama, Utsunomiya (JP); Keisuke Tsuta, Utsunomiya (JP); Ryouji Kitamura, Minamitsuru-gun (JP)

(73) Assignees: HONDA MOTOR CO., LTD., Tokyo (JP); FANUC CORPORATION, Yamanashi (JP)

( * ) Notice: Subject to any disclaimer, the term of this patent is extended or adjusted under 35 U.S.C. 154(b) by 0 days. days.

(21) Appl. No.: 15/300,503

(22) PCT Filed: Apr. 10, 2015

(86) PCT No.: PCT/JP2015/061213
    § 371 (c)(1),
    (2) Date: Sep. 29, 2016

(87) PCT Pub. No.: WO2015/159814
    PCT Pub. Date: Oct. 22, 2015

(65) Prior Publication Data
    US 2017/0157699 A1    Jun. 8, 2017

(30) Foreign Application Priority Data
    Apr. 16, 2014    (JP) .................................. 2014-084653

(51) Int. Cl.
    *B23K 31/02*        (2006.01)
    *B23K 20/12*        (2006.01)
    *B23K 20/26*        (2006.01)

(52) U.S. Cl.
    CPC .......... *B23K 20/125* (2013.01); *B23K 20/123* (2013.01); *B23K 20/26* (2013.01)

(58) Field of Classification Search
    CPC ....................................... B23K 20/122–20/128
    (Continued)

(56) References Cited

U.S. PATENT DOCUMENTS 6,199,745 B1    3/2001  Campbell et al.
6,758,382 B1 *  7/2004  Carter ................... B23K 20/12
                                                   228/112.1
(Continued)

FOREIGN PATENT DOCUMENTS

JP      2002-226963 A       8/2002
JP      2004050205 A    *   2/2004
(Continued)

OTHER PUBLICATIONS

International Search Report dated Jul. 14, 2015, issued in International Application No. PCT/JP2015/061213, with English translation. (4 pages).
(Continued)

*Primary Examiner* — Kiley Stoner
(74) *Attorney, Agent, or Firm* — Westerman, Hattori, Daniels & Adrian, LLP (57) ABSTRACT

The friction stir welding apparatus includes a pin (20) on which a soft nitrided layer (50) is formed. The soft nitrided layer (50) is formed of an iron lithium oxide layer (51) and a nitrided diffusion layer (52). The atom of the iron lithium oxide layer (51) penetrates into a space between atoms at the surface of the pin (20) to form the nitrided diffusion layer (52).

1 Claim, 9 Drawing Sheets

(58) Field of Classification Search
USPC ............................................. 228/2.1, 112.1
See application file for complete search history.

(56) References Cited

U.S. PATENT DOCUMENTS

| | | | |
|---|---|---|---|
| 7,686,202 B1* | 3/2010 | Carter ................ | B23K 20/1255 228/2.1 |
| 2003/0201307 A1* | 10/2003 | Waldron .............. | B23K 20/122 228/112.1 |
| 2003/0209588 A1* | 11/2003 | Colligan ............ | B23K 20/1255 228/112.1 |
| 2004/0025971 A1 | 2/2004 | Sato et al. | |
| 2004/0040630 A1 | 3/2004 | Eiraku et al. | |
| 2006/0249556 A1 | 11/2006 | Subramanian et al. | |
| 2008/0217377 A1* | 9/2008 | Stol .................... | B23K 20/1255 228/2.3 |
| 2009/0255321 A1* | 10/2009 | Sylva .................. | G01L 5/0076 73/1.15 |
| 2010/0288820 A1* | 11/2010 | Aliaga ................ | B23K 20/123 228/112.1 |
| 2012/0006883 A1* | 1/2012 | Nishida ............... | B23K 20/123 228/112.1 |
| 2012/0298724 A1* | 11/2012 | Kato ................... | B23K 20/1245 228/2.1 |
| 2013/0119115 A1* | 5/2013 | Kato ................... | B23K 20/1255 228/112.1 |
| 2014/0119814 A1* | 5/2014 | Osikowicz ......... | B23K 20/1255 403/270 |
| 2014/0231490 A1* | 8/2014 | Sato .................... | B23K 20/126 228/2.1 |
| 2015/0273623 A1* | 10/2015 | Kato ................... | B23K 20/1245 228/112.1 |
| 2016/0059345 A1* | 3/2016 | Kato ................... | B23K 37/0235 228/114.5 |
| 2016/0074957 A1* | 3/2016 | Nishida .............. | B23K 37/0235 228/114.5 |
| 2016/0221116 A1* | 8/2016 | Kato ................... | B23K 20/122 |

FOREIGN PATENT DOCUMENTS

| | | | |
|---|---|---|---|
| JP | 2004-091906 A | | 3/2004 |
| JP | 2004114137 A | * | 4/2004 |
| JP | 2005-152909 A | | 6/2005 |
| JP | 2008-149331 A | | 7/2008 |
| JP | 2011-200880 A | | 10/2011 |

OTHER PUBLICATIONS

Notification of Transmittal of Translation of the International Preliminary Report on Patentability (Form PCT/IB/338) of International Application No. PCT/JP2015/061213, dated Aug. 23, 2016, with Forms PCT/IB/373 and PCT/ISA/237. (12 pages).

* cited by examiner

(a) EXAMPLE (b) COMPARATIVE EXAMPLE

FRICTION STIR WELDING APPARATUS

TECHNICAL FIELD

The present invention relates to an improvement of a friction stir welding apparatus.

BACKGROUND

Figure 10:
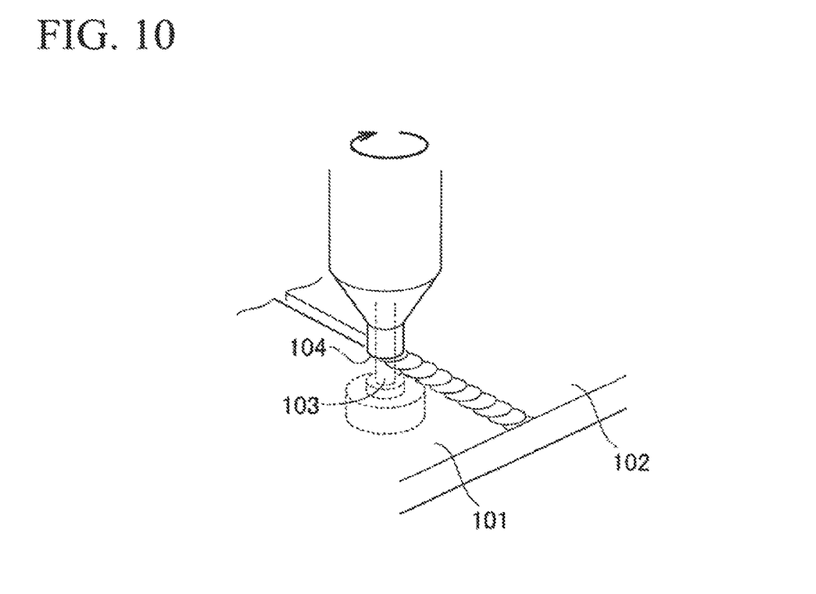
FIG. 10 is a view for describing a principle of friction stir welding.

As shown in FIG. 10, two works 101, 102 made of aluminum alloy are butted to each other, and a pin 103 that rotates at a high speed and a shoulder 104 are applied on the butted part. Based on generated friction heat and stirring according to rotation, friction stir welding is performed. The pin 103 and the shoulder 104 are made of steel.

Aluminum (Al) and iron (Fe) have strong affinity. When Fe is caused to come into contact with Al at a high temperature and under a high pressure, Fe and Al react with each other, and an intermetallic compound of an Al—Fe—Si system is generated. The intermetallic compound adheres to the pin 103 and the shoulder 104. As measures for preventing this adhesion, a friction stir welding apparatus shown in Patent Document 1 has been proposed.

Figure 11:
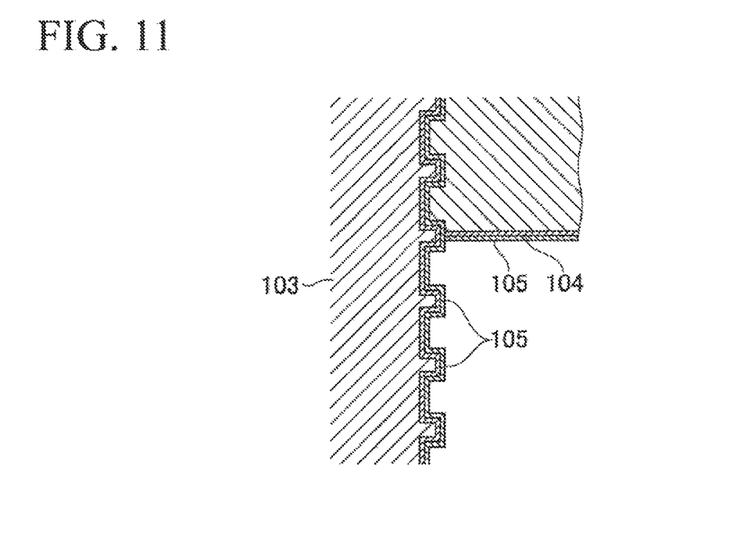
FIG. 11 is an enlarged view of the cross-section of the main part of a pin and a shoulder of the related art.

As shown in FIG. 11, the friction stir welding apparatus according to Patent Document 1, a diamond-like carbon 105 that prevents adhesion of aluminum is formed on the pin 103 and the shoulder 104. The diamond-like carbon 105 prevents aluminum and steel from coming into contact with each other, and thereby, it is possible to prevent an intermetallic compound of an Al—Fe—Si system from being generated.

However, in the friction stir welding, since the diamond-like carbon 105 comes into contact with a work made of aluminum at a high temperature and under a high pressure, the diamond-like carbon 105 is exfoliated from the pin 103 and the shoulder 104 after a relatively short time. In this way, according to a coating technique using the diamond-like carbon 105, the lifetime of a tool is short. In order to reduce the frequency of replacement of a tool, it is required to extend the lifetime of the tool.

In the technique of Patent Document 1, a process head is provided movably in the horizontal direction on a gate-shaped column, and a rotation tool is provided on the process head. Therefore, the size of the friction stir welding apparatus is increased.

RELATED ART DOCUMENTS

Patent Documents

[Patent Document 1] Japanese Unexamined Patent Application, First Publication No. 2005-152909

SUMMARY OF INVENTION

Problems to be Solved by the Invention

A problem to be solved by the present invention is to provide a lightweight and compact friction stir welding apparatus.

Means for Solving the Problem

The present invention provides is a friction stir welding apparatus that includes an upper-side rotation shoulder that is arranged above a work, a lower-side rotation shoulder that is arranged below the work, a rotation main shaft that integrally includes the lower-side rotation shoulder and penetrates inside the upper-side rotation shoulder, a first actuator that gives a rotation force to the rotation main shaft, a second actuator that moves the upper-side rotation shoulder in an axial direction, a load detection means that detects an axial load applied on the second actuator, a load control unit that controls a load applied on a work by the upper-side rotation shoulder based on load information obtained from the load detection means, a position sensor that detects a position of the lower-side rotation shoulder, and a controller that controls the position of the lower-side rotation shoulder based on position information from the position sensor, wherein both the first actuator and the second actuator are immovably attached to the base plate.

Preferably, the base plate is moved upward and downward by a robot that is controlled by the controller.

Preferably, a shaft of the first actuator, a shaft of the second actuator, and the rotation main shaft are supported by the robot while being arranged in parallel with one another.

Advantage of the Invention

In the present invention, the lower-side rotation shoulder does not include an actuator used for a load control. As a result, according to the present invention, the friction stir welding apparatus can be realized by only two actuators.

Therefore, according to the present invention, a lightweight and compact friction stir welding apparatus that includes the upper-side rotation shoulder and the lower-side rotation shoulder is provided.

In the present invention, a robot has superior position control performances, and therefore, a position control of the rotation main shaft is directly performed by using the robot. Further, from another point of view, the friction stir welding apparatus of the present invention is small and lightweight to therefore be able to be easily attached to a robot.

In the present invention, the shaft of the first actuator and the shaft of the second actuator are arranged in parallel with the rotation main shaft.

DESCRIPTION OF THE EMBODIMENTS

Hereinafter, embodiments of the present invention are described based on the accompanied drawings.

EXAMPLES

Figure 1:
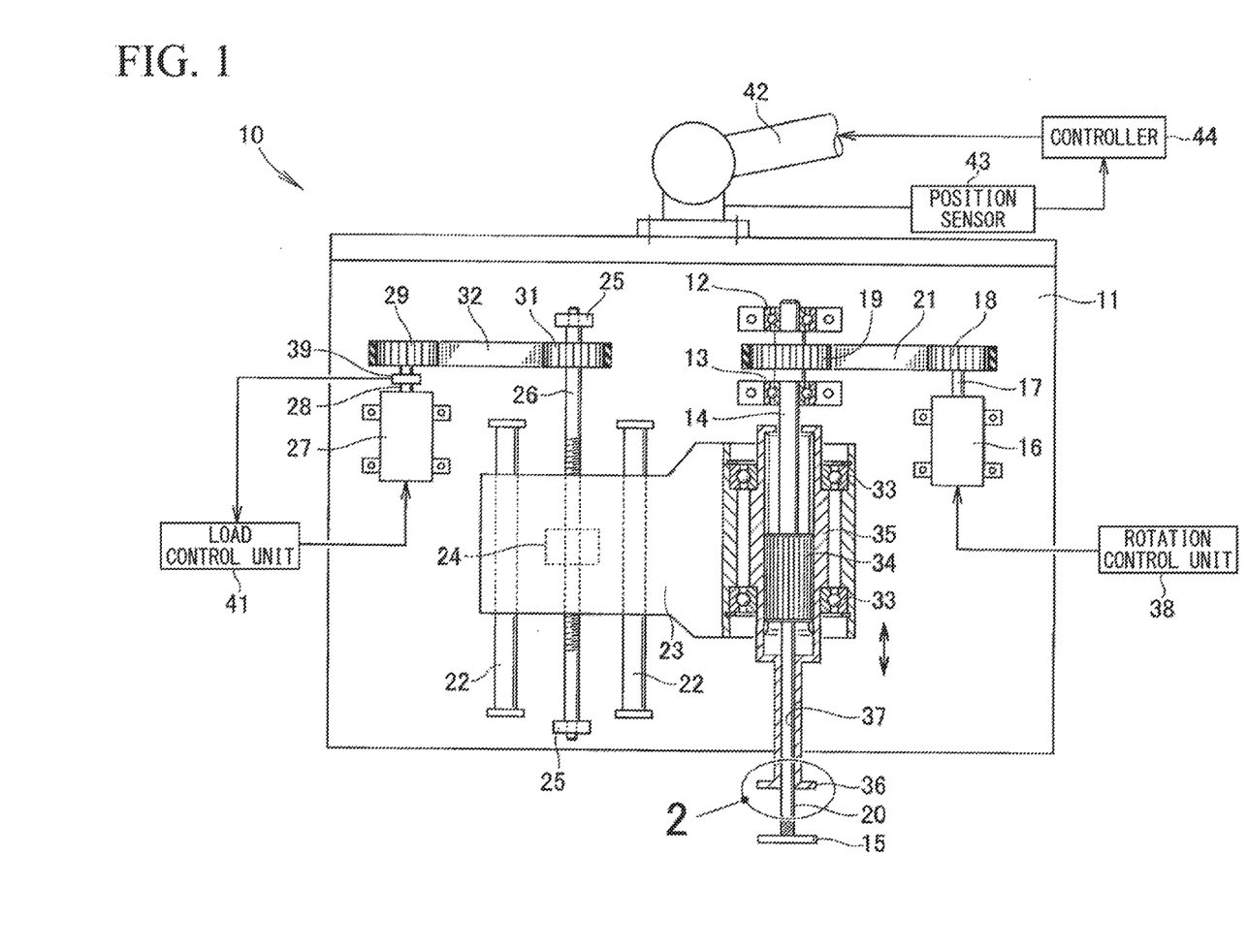
FIG. 1 is a front view of a friction stir welding apparatus according to the present invention.

As shown in FIG. 1, a friction stir welding apparatus 10 includes a base plate 11 that extends downward, a rotation main shaft 14 that is supported rotatably by the base plate 11 via a pair of bearings 12, 13 and extends downward, a pin 20 that is formed integrally at a lower part of the rotation main shaft 14, a lower-side rotation shoulder 15 that is formed integrally at a lower end of the pin 20, a first actuator 16 that is attached to the base plate 11, a first drive pulley 18 that is attached to a rotation shaft 17 of the first actuator 16, a first driven pulley 19 that is provided on the rotation main shaft 14 at a position interposed between the pair of bearings 12, 13, a first belt 21 that is hung over the first driven pulley 19 and the first drive pulley 18, rails 22, 22 that are laid on the base plate 11 in parallel with the rotation main shaft 14, a slider 23 that is attached movably to the rails 22, 22, a ball nut 24 that is attached to the slider 23, a ball screw 26 that is screwed to the ball nut 24 and is supported rotatably by the base plate 11 via support pieces 25, 25, a second actuator 27 that is attached to the base plate 11, a second drive pulley 29 that is attached to a rotation shaft 28 of the second actuator 27, a second driven pulley 31 that is provided on the ball screw 26 in the vicinity of one of the support pieces 25, a second belt 32 that is hung over the second driven pulley 31 and the second drive pulley 29, a rotation cylinder 35 that is supported rotatably by the slider 23 via bearings 33, 33, surrounds the rotation main shaft 14, and is joined to the rotation main shaft 14 via a spline 34, and an upper-side rotation shoulder 36 that is formed integrally at a lower end of the rotation cylinder 35.

The first actuator 16 is controlled by a rotation control unit 38.

A load detection means 39 is provided on the rotation shaft 28 of the second actuator 27. The load detection means 39 is, for example, a strain gauge that replaces a mechanical strain amount by an electric signal. Alternatively, when the second actuator 27 is a servomotor, the load detection means 39 may be a device that detects a current and converts the current into a load.

The second actuator 27 is controlled by a load control unit 41 that controls a downward load of the upper-side rotation shoulder 36 based on information of the load detection means 39.

In the present example, the rotation shaft 17 of the first actuator 16, the rotation shaft 28 of the second actuator 27, and the rotation main shaft 14 are arranged in parallel with one another. An inter-shaft distance of the rotation main shaft 14 and the rotation shafts 17, 28 can be arbitrarily set. This can be dealt with adjustments of the lengths of the belts 21, 32.

By decreasing the inter-shaft distance as much as possible, the size of the friction stir welding apparatus 10 can be made compact, specifically, the width in the horizontal direction can be reduced.

Such a friction stir welding apparatus 10 is small and lightweight and therefore can be easily attached to a front end of a robot 42. The robot 42 always has a position sensor 43 that monitors the coordinate of the front end and a controller 44 that controls the robot 42 while feeding back information of the position sensor 43.

The base plate 11 is carried to an arbitrary position by the robot 42. Since the rotation main shaft 14 is attached to the base plate 11 via the bearings 12, 13, the position (specifically, height position) of the lower-side rotation shoulder 15 at a lower end of the rotation main shaft 14 is controlled by the controller 44.

On the other hand, the rotation cylinder 35 is connected by the spline 34 to the rotation main shaft 14 and is movable along the rotation main shaft 14. When the ball screw 26 is rotated using the second actuator 27, the slider 23 moves upward or downward along the rails 22, 22. Then, the rotation cylinder 35 and the upper-side rotation shoulder 36 move together with the slider 23. Accordingly, the upper-side rotation shoulder 36 is moved to an arbitrary position independently of the lower-side rotation shoulder 15 by the second actuator 27 as a drive source, and a load control by the load control unit 41 is applied on the upper-side rotation shoulder 36.

When the rotation main shaft 14 is rotated by the first actuator 16, the rotation cylinder 35 is rotated via the spline 34. Accordingly, the upper-side rotation shoulder 36 and the lower-side rotation shoulder 15 are rotated in synchronization with each other.

That is, in the friction stir welding apparatus 10, the lower-side rotation shoulder 15 is integrally formed together with the rotation main shaft 14, and the rotation main shaft 14 passes inside the upper-side rotation shoulder 36. The friction stir welding apparatus 10 includes the first actuator 16 that gives a rotation force to the rotation main shaft 14, the second actuator 27 that axially displaces (moves in an axial direction) the upper-side rotation shoulder 36, and the controller 44 that controls the position of the lower-side rotation shoulder 15. The second actuator 27 performs a load control based on a load obtained from the load detection means 39, and the controller 44 controls the position of the lower-side rotation shoulder 15 based on the information from the position sensor 43 that detects the position of the lower-side rotation shoulder 15.

The position sensor 43 may be embedded in the controller 44. Further, the drive pulleys 18, 29 and the driven pulleys 19, 31 may be a gear. Furthermore, the rotation main shaft 14 may be directly rotated by the first actuator 16 via a coupling. Similarly, the ball screw 26 may be directly rotated by the second actuator 27 via a coupling. Accordingly, the configuration of the friction stir welding apparatus 10 shown in FIG. 1 may be appropriately changed.

In the present invention, a surface process is applied on the pin 20. The surface process is described in detail.

Figure 2:
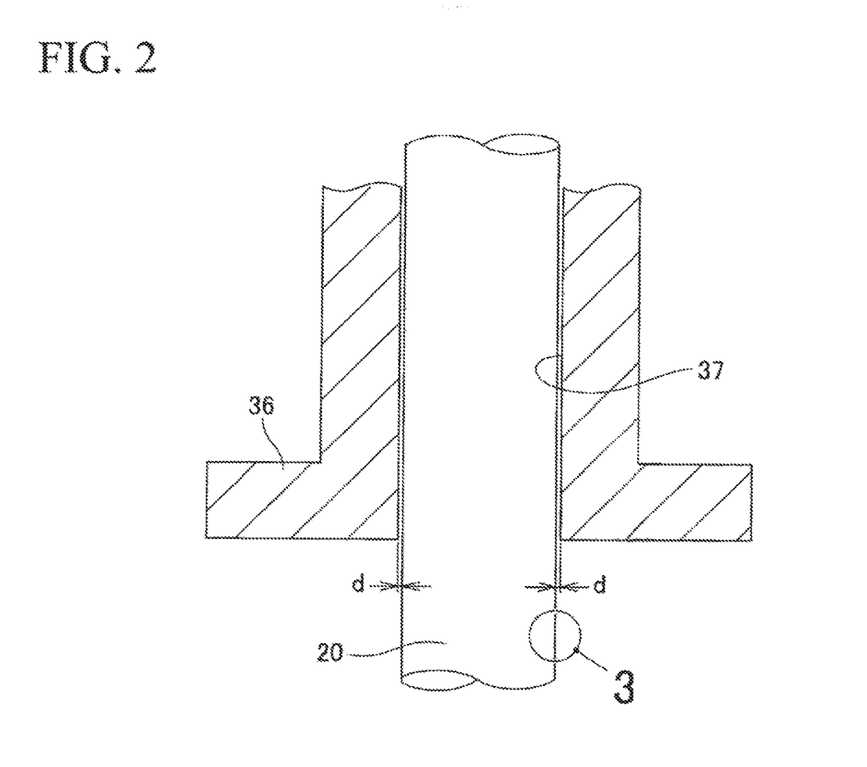
FIG. 2 is an enlarged view of Part 2 of FIG. 1.

As shown in FIG. 2, the pin 20 is stored in a hole 37 that is provided at the center of the upper-side rotation shoulder 36. A gap "d" is provided between the inner circumferential surface of the hole 37 and the outer circumferential surface of the pin 20 in order for the upper-side rotation shoulder 36 to move upward and downward with respect to the pin 20. The gap "d" is 10 to 30 μm.

Figure 3:
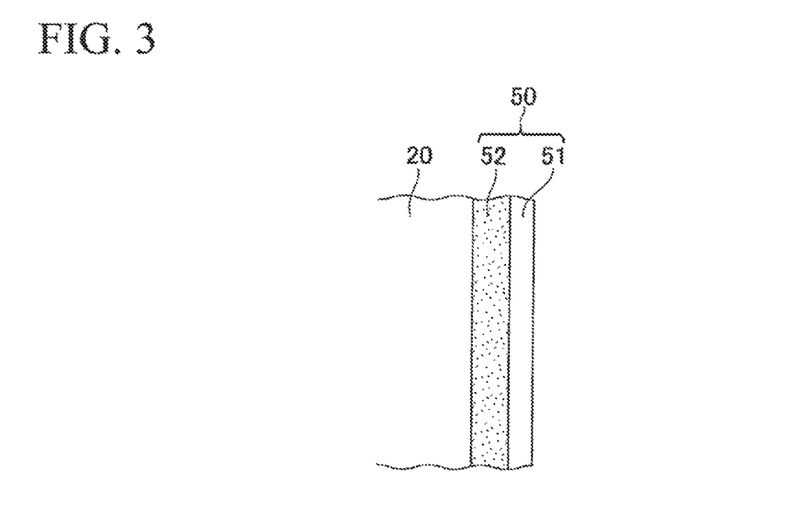
FIG. 3 is an enlarged view of Part 3 of FIG. 2.

As shown in FIG. 3 which is an enlarged view of Part 3 of FIG. 2, a soft nitrided layer 50 that contains lithium is formed on the surface of the pin 20. The soft nitrided layer 50 is formed of an iron lithium oxide layer 51 and a nitrided diffusion layer 52. The atom of the iron lithium oxide layer 51 penetrates into a space between atoms at the surface of the pin 20 to form the nitrided diffusion layer 52. That is, atoms are bound in a form in which the atoms are engaged with each other. Therefore, the soft nitrided layer 50 is not easily exfoliated from the pin 20.

The iron lithium oxide layer 51 can be obtained by an immersion process of the pin 20 in a nitriding salt-bath in which a lithium ion is a cation component. Preferably, after a nitriding salt-bath process, a displacement washing salt-bath process in which a process is made using a salt bath containing at least one selected from sodium nitrate, potassium nitrate, and lithium nitrate or containing at least one selected from sodium nitrate, potassium nitrate, and lithium nitrate and at least one selected from sodium nitrite, potassium nitrite, and lithium nitrite, a cooling process according to a water cooling, an oil cooling, or an air cooling, and a washing process in which washing is performed using hot water are applied. It is possible to sufficiently remove a residual salt component from the pin 20 by this washing.

As described in FIG. 1, in the friction stir welding apparatus 10, the pin 20 that passes through the hole 37 formed on the upper-side rotation shoulder 36 and rotates together with the lower-side rotation shoulder 15 is integrally attached to the lower-side rotation shoulder 15, and as described in FIG. 3, the iron lithium oxide layer 51 that contains lithium is formed on the surface of the pin 20.

Next, the operation of the friction stir welding apparatus 10 that has the above configurations is described.

Figure 4:
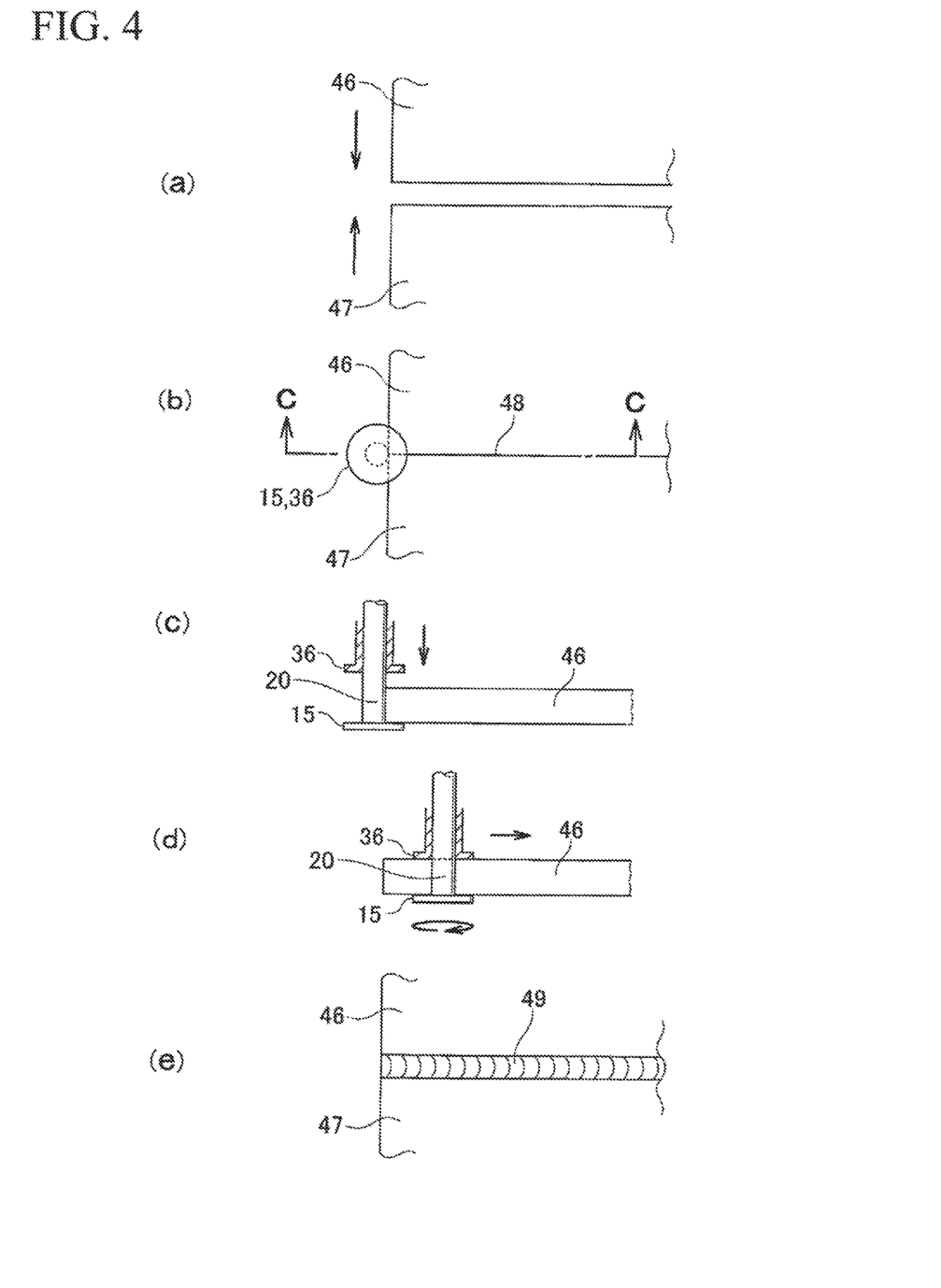
FIG. 4 is an action view of an upper-side rotation shoulder and a lower-side rotation shoulder.

As shown in part (a) of FIG. 4, works 46, 47 which are aluminum alloy plates are butted to each other. In this example, the works are butted to each other; however, the works 46, 47 may be overlapped with each other. In the case of overlapping, three or more works can be overlapped with one another to be joined.

As shown in part (b) of FIG. 4, the upper-side rotation shoulder 36 and the lower-side rotation shoulder 15 are caused to approach to one end of a joint part 48.

As shown in part (c) of FIG. 4 which is a C-C arrow view of part (b) of FIG. 4, the lower-side rotation shoulder 15 is butted to the lower surface of the work 46 and is maintained at the height. Next, the upper-side rotation shoulder 36 is moved downward to push the upper surface of the work 46 at a predetermined load.

As shown in part (d) of FIG. 4, the upper-side rotation shoulder 36 and the lower-side rotation shoulder 15 are rotated at a predetermined rotation speed. Then, friction heat is generated, and fluidization phenomenon occurs. In this state, the shoulders are moved as indicated by the arrow.

As a result, as shown in part (e) of FIG. 4, the works 46, 47 are joined to each other by a bead 49.

Figure 5:
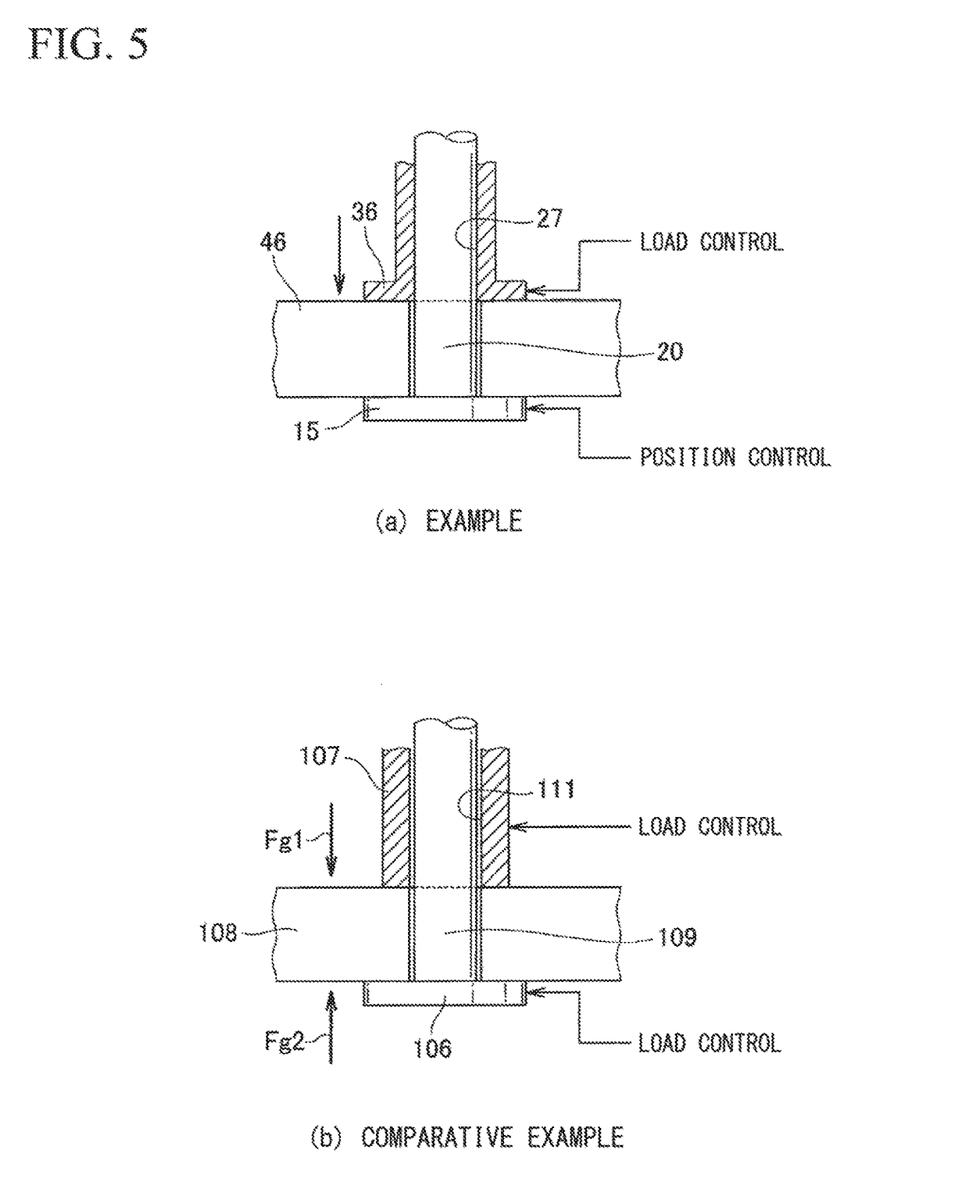
FIG. 5 is a view in which Example and Comparative Example are compared.

In Example shown in part (a) of FIG. 5, a position control is performed on the lower-side rotation shoulder 15, and a load control is performed on the upper-side rotation shoulder 36.

On the other hand, in Comparative Example shown in part (b) of FIG. 5, a load control is performed on both a lower-side rotation shoulder 106 and an upper-side rotation shoulder 107. The friction heat softens a work 108. When the load is too large, the lower-side rotation shoulder 106 or the upper-side rotation shoulder 107 excessively penetrates into the work 108. In order to solve the problem, loads Fg1, Fg2 is reduced corresponding to softening.

Therefore, it is considered to reduce the downward load Fg1 of the upper-side rotation shoulder 107.

The upward load Fg2 at the lower-side rotation shoulder 106 is made constant. In this state, the downward load Fg1 of the upper-side rotation shoulder 107 is reduced. Then, the work 108 may be floated. In order to prevent the floating, the upward load Fg2 at the lower-side rotation shoulder 106 is reduced.

That is, when the load control is performed on both the lower-side rotation shoulder 106 and the upper-side rotation shoulder 107, one affects the other, so-called hunting (fluctuation of a load signal) occurs, the increase and decrease of the load are repeated too much, and the load is unstable.

Further, the work 108 expands in accordance with the increase in temperature. When uncontrolled, the load becomes too large. At this time, hunting also occurs.

In this regard, in the case of part (a) of FIG. 5, since a position control is performed on the lower-side rotation shoulder 15 and a load control is performed on the upper-side rotation shoulder 36, such a problem does not occur. As a result, a stable jointing work can be maintained against softening or expansion of the work 46.

As described in FIG. 3, the iron lithium oxide layer 51 is formed on the surface of the pin 20. Iron lithium oxide has much weaker affinity with respect to aluminum than Fe. Accordingly, it is unnecessary to have a concern about a possibility that an intermetallic compound is generated.

In FIG. 2, it is unnecessary to have a concern about a possibility that an aluminum alloy enters the gap d between the upper-side rotation shoulder 36 and the pin 20 to form an intermetallic compound. Accordingly, it is possible to smoothly move the upper-side rotation shoulder 36 with respect to the pin 20 in the axial direction.

Further, in Comparison Example of part (b) of FIG. 5, the upper-side rotation shoulder 107 frequently moves upward and downward with respect to a pin 109. There is a high possibility that the pin 109 swings with respect to a hole 111 in a direction perpendicular to the axial direction. Then, the inner circumferential surface of the hole 111 comes into contact with the pin 109. Since the upper-side rotation shoulder 107 frequently moves upward and downward, even the soft nitrided layer 50 is exfoliated.

In this regard, according to Example shown in part (a) of FIG. 5, the upward and downward movement of the upper-side rotation shoulder 36 with respect to the pin 20 is greatly reduced. As a result, the time to exfoliation of the soft nitrided layer 50 can be dramatically extended.

Next, a modified example is described.

Figure 6:
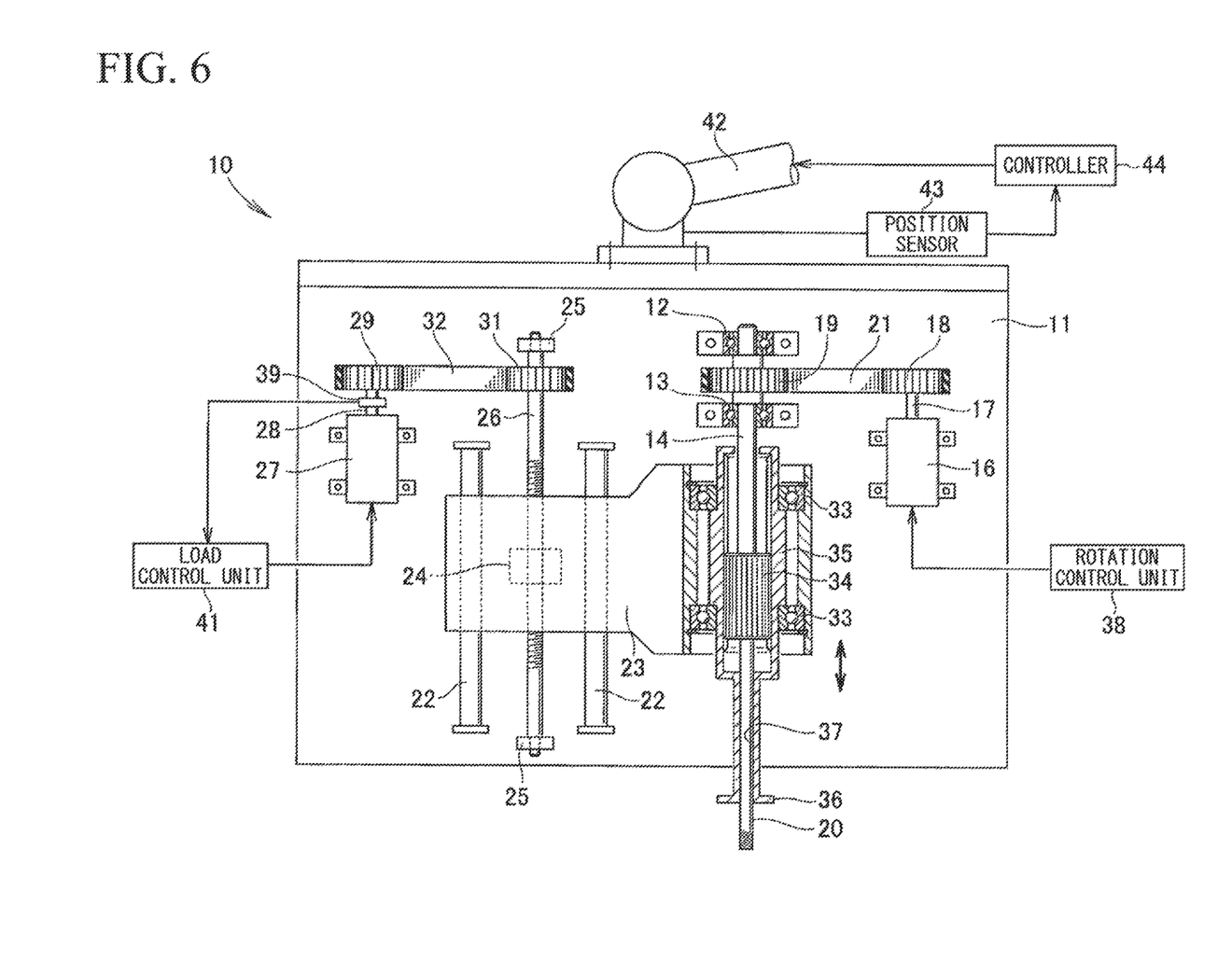
FIG. 6 is a view for describing a modified example of the friction stir welding apparatus.

In a friction stir welding apparatus 10 shown in FIG. 6, the lower-side rotation shoulder (FIG. 1, reference numeral 15) is removed from the pin 20. Since other components are the same as those of the friction stir welding apparatus 10 shown in FIG. 1, the same reference numerals as those of FIG. 1 are used, and detailed description is omitted.

That is, the present invention is applied on both the friction stir welding apparatus 10 in which the lower-side rotation shoulder (FIG. 1, reference numeral 15) is provided at the pin 20 and the friction stir welding apparatus 10 in which the lower-side rotation shoulder (FIG. 1, reference numeral 15) is not provided at the pin 20.

Next, the superiority of the above soft nitrided layer 50 is described further in detail.

Figure 7:
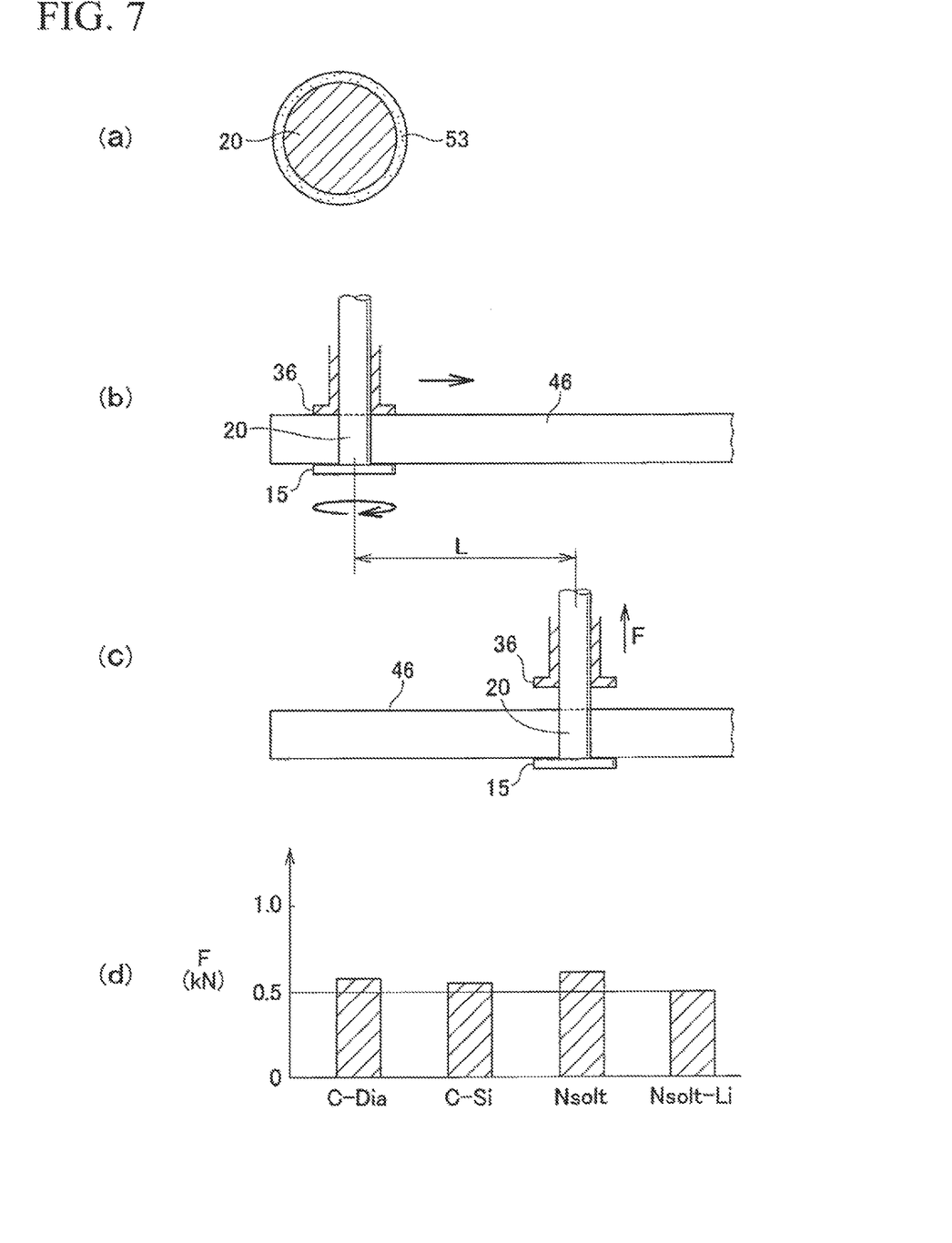
FIG. 7 is a comparison view in a film of a plurality of types.

As shown in part (a) of FIG. 7, a variety of films 53 as described based on part (d) of FIG. 7 is applied on the pin 20.

Next, as shown in part (b) of FIG. 7, the upper-side rotation shoulder 36, the pin 20, and the lower-side rotation shoulder 15 are rotated at a predetermined rotation speed. Then, friction heat is generated, and fluidization phenomenon occurs. In this state, the members are moved as indicated by the arrow.

When a movement distance L reaches 600 mm, the movement is stopped. Then, as shown in part (c) of FIG. 7, the upper-side rotation shoulder 36 is moved upward. A force F that is required for the upward movement is measured. As the adhesion phenomenon is more dominant, the force F is increased.

As shown in part (d) of FIG. 7, the force F was measured with respect to a sample material in which C-Dia (diamond-like carbon) is coated on the pin 20, a sample material in which C—Si (silicon carbide) is coated on the pin 20, a sample material in which Nsolt (salt-bath soft nitrided layer not containing lithium) is covered on the pin 20, and a sample material in which Nsolt-Li (salt-bath soft nitrided layer containing lithium) is covered on the pin 20. As a result of measurement, Nsolt-Li (salt-bath soft nitrided layer containing lithium) showed the smallest force F and good results of the four sample materials.

Next, Nsolt-Li (salt-bath soft nitrided layer containing lithium) is focused on, and the surface of Nsolt-Li, that is, the lithium content in a lithium containing layer 51 is evaluated.

A sample material in which the lithium content is 0, a sample material in which the lithium content is 0.06 wt %, and a sample material in which the lithium content is 0.7 wt % were prepared for this evaluation. With respect to an outermost surface of the iron lithium oxide layer, measurement is performed using a GD-OES analysis in which a display element is Li, C, N, O, Fe, Cr, W, and V. A weight percent with respect to a base material component within 1 μm from the outermost surface is calculated.

Next, slide performances of the sample materials prepared as Example and Comparative Example were evaluated using a Farex frictional wear testing machine. Specifically, under a test condition in which: surface roughness was made the same between the sample materials; the sample material was rotated at a rotation speed of 600 rpm; and V blocks were pushed to the sample material from both sides at a constant load of 20 kg without lubrication, a friction coefficient μ and a torque were measured.

First, a pair of blocks made of a 6000-series aluminum alloy was used. Each of the three sample materials (pin 20) was caused to come into slidably contact with the 6000-series aluminum alloy to thereby obtain friction coefficients μ and torques shown in part (a) and part (b) of FIG. 8.

Figure 8:
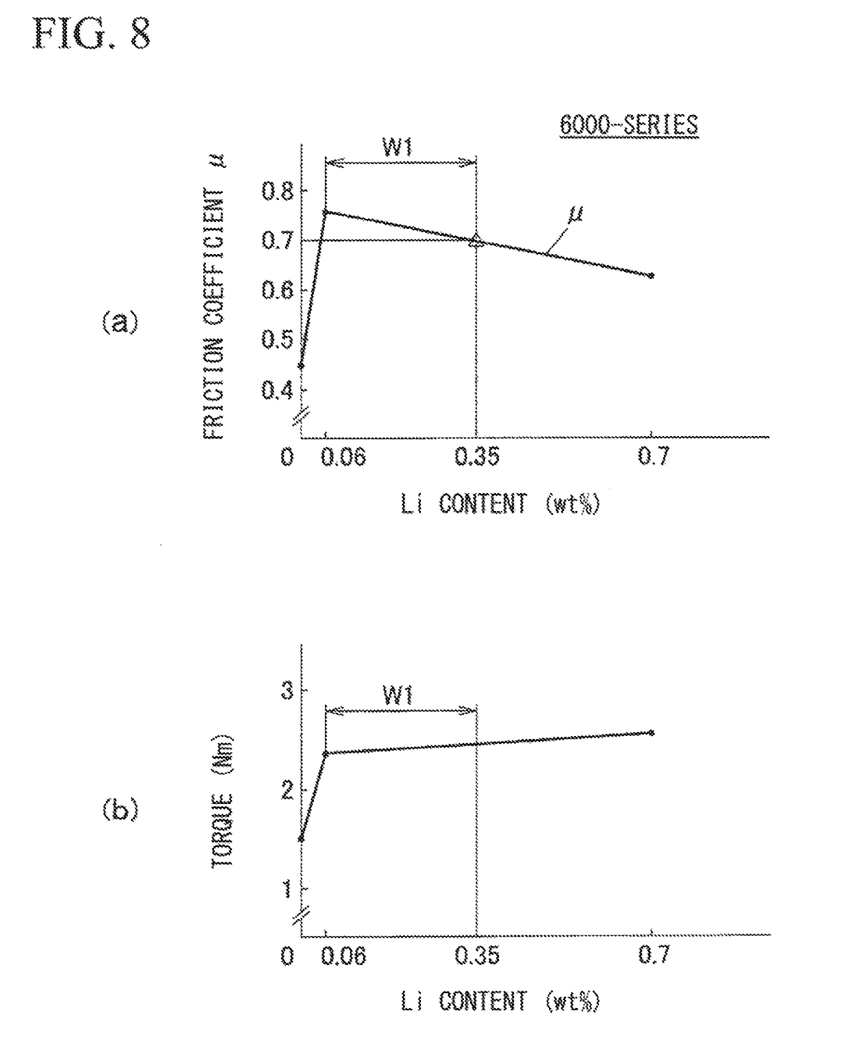
FIG. 8 is a correlation view between the content of lithium and a friction coefficient obtained by welding of a 6000-series aluminum alloy.

As shown in part (a) of FIG. 8, when the lithium content is 0, the friction coefficient μ was small. When the lithium content is 0.06 wt %, the friction coefficient μ was sufficiently large. When the lithium content is 0.7 wt %, the friction coefficient μ was small.

In the friction stir welding, in order to generate friction heat, it is required that the friction coefficient μ is 0.7 or more.

When the lithium content is in a range of 0.35 wt % or less or is, preferably, in a range W1 of 0.06 to 0.35 wt %, the friction coefficient μ is 0.7 or more.

As shown in part (b) of FIG. 8, when the lithium content is in the range W1 of 0.06 to 0.35 wt %, the torque is substantially constant, and the friction stir welding can be smoothly conducted.

Next, a pair of blocks made of a 5000-series aluminum alloy specified by JIS was used. Each of the three sample materials (pin 20) was caused to come into slidably contact with the 5000-series aluminum alloy to thereby obtain friction coefficients μ and torques shown in part (a) and part (b) of FIG. 9.

Figure 9:
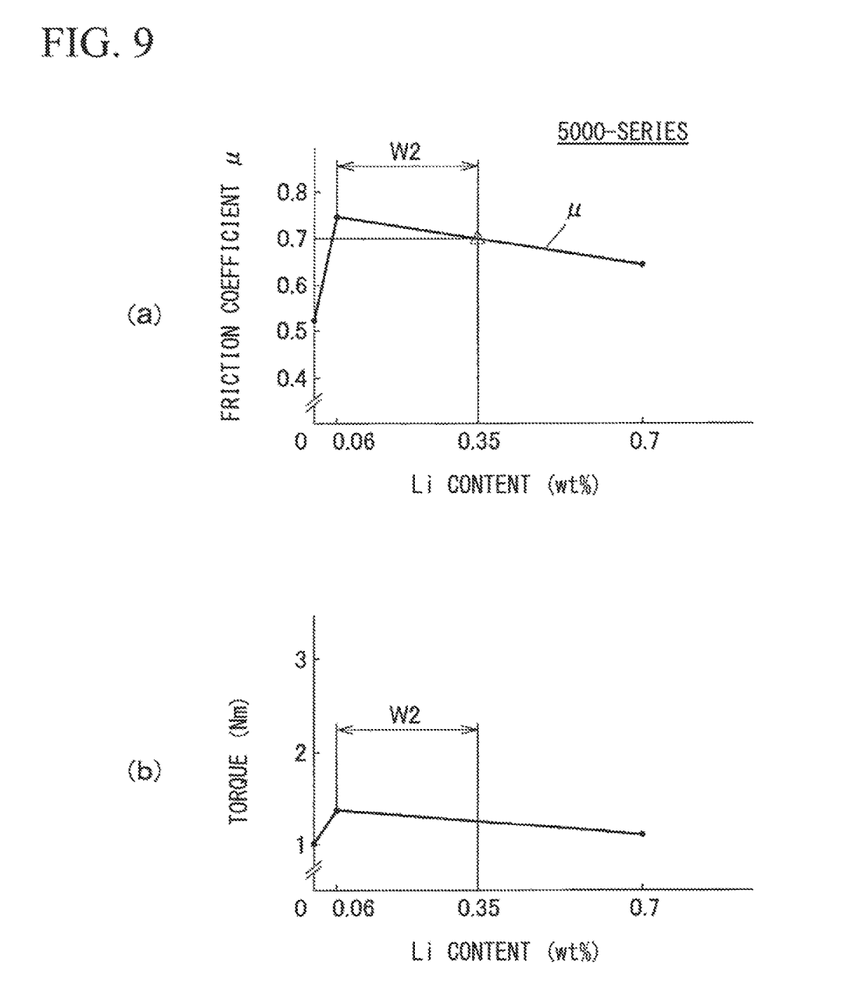
FIG. 9 is a correlation view between the content of lithium and a friction coefficient obtained by welding of a 5000-series aluminum alloy.

As shown in part (a) of FIG. 9, when the lithium content is 0, the friction coefficient μ was small. When the lithium content is 0.06 wt %, the friction coefficient μ was sufficiently large. When the lithium content is 0.7 wt %, the friction coefficient μ was small.

When the lithium content is in a range of 0.35 wt % or less or is, preferably, in a range W2 of 0.06 to 0.35 wt %, the friction coefficient μ is 0.7 or more.

As shown in part (b) of FIG. 9, when the lithium content is in the range W2 of 0.06 to 0.35 wt %, the torque is substantially constant, and the friction stir welding can be smoothly conducted.

From FIG. 8 and FIG. 9, the lithium content at a surface of an iron lithium oxide layer coated on the pin 20 that joins two aluminum alloy plates can be preferably in a range of 0.35 wt % or less or, more preferably, in a range of 0.06 to 0.35 wt %. When the lithium content is in the range, smooth friction stir welding can be conducted.

INDUSTRIAL APPLICABILITY

The present invention is suitable for a friction stir welding apparatus that joins two or more aluminum plates by a friction stir welding method.

DESCRIPTION OF REFERENCE SYMBOLS

10: friction stir welding apparatus
20: pin
36: upper-side rotation shoulder
37: hole
46: work
47: work
51: iron lithium oxide layer

The invention claimed is:

1. A friction stir welding apparatus comprising
an upper-side rotation shoulder that is arranged above a work,
a lower-side rotation shoulder that is arranged below the work,
a rotation main shaft that integrally includes the lower-side rotation shoulder and penetrates inside the upper-side rotation shoulder,
a base plate that rotatably supports the rotation main shaft,
a first actuator that gives a rotation force to the rotation main shaft,
a second actuator that moves the upper-side rotation shoulder in an axial direction,
a load detection means that detects an axial load applied on the second actuator,
a load control unit that controls a load applied on a work by the upper-side rotation shoulder based on load information obtained from the load detection means,
a position sensor that detects a position of the lower-side rotation shoulder,
a controller that controls the position of the lower-side rotation shoulder based on position information from the position sensor,
a first drive pulley that is attached to a rotation shaft of the first actuator,
a first driven pulley that is provided on the rotation main shaft at a position interposed between a pair of bearings,
a first belt that is hung over the first driven pulley and the first drive pulley,
a slider that is attached movably to rails that are laid on the base plate in parallel with the rotation main shaft,
a ball nut that is attached to the slider,
a ball screw that is screwed to the ball nut and is supported rotatably by the base plate via support pieces,
a second drive pulley that is attached to a rotation shaft of the second actuator,
a second driven pulley that is provided on the ball screw in the vicinity of one of the support pieces, and a second belt that is hung over the second driven pulley and the second drive pulley, wherein both the first actuator and the second actuator are immovably attached to the base plate, the base plate is moved upward and downward by a robot that is controlled by the controller, and a shaft of the first actuator, a shaft of the second actuator, and the rotation main shaft are supported by the robot while being arranged in parallel with one another.

* * * * *